United States Patent
Platner et al.

(10) Patent No.: US 7,210,673 B2
(45) Date of Patent: May 1, 2007

(54) METHOD FOR RELIEVING SPRING SEAT MOUNTING STRESSES

(75) Inventors: David K. Platner, Shelby, MI (US);
Rajesh J. Somnay, Troy, MI (US);
Xinyu Wen, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 304 days.

(21) Appl. No.: 10/411,488

(22) Filed: Apr. 10, 2003

(65) Prior Publication Data

US 2004/0201144 A1    Oct. 14, 2004

(51) Int. Cl.
*B60G 11/02* (2006.01)

(52) U.S. Cl. .................... 267/52; 267/36.1; 267/47; 280/124.175

(58) Field of Classification Search ............... 267/52, 267/246, 229, 36.1, 41–49, 158–165, 148–149, 267/260; 280/124.17–124.176
See application file for complete search history.

(56) References Cited

U.S. PATENT DOCUMENTS

| | | | | |
|---|---|---|---|---|
| 1,076,961 A | * | 10/1913 | Doble | 267/52 |
| 1,623,845 A | * | 4/1927 | Kogstrom | 267/262 |
| 2,587,522 A | * | 2/1952 | Pilkington, Jr. | 267/52 |
| 2,697,613 A | * | 12/1954 | Giacosa | 280/124.14 |
| 3,434,707 A | * | 3/1969 | Raidel | 267/31 |
| 3,802,718 A | * | 4/1974 | Schaeff | 280/124.116 |
| 3,814,410 A | * | 6/1974 | Fukui et al. | 267/47 |
| 4,322,061 A | * | 3/1982 | Masser | 267/269 |
| 4,337,632 A | | 7/1982 | Lienert | |
| 4,512,559 A | | 4/1985 | Aoyama et al. | |
| 4,707,317 A | | 11/1987 | Epel et al. | |
| 4,801,129 A | * | 1/1989 | Wells | 267/52 |
| 5,035,406 A | * | 7/1991 | Sellers et al. | 267/48 |
| 5,362,095 A | * | 11/1994 | Eveley | 280/86.75 |
| 6,361,032 B1 | | 3/2002 | Lawson | |
| 6,406,007 B1 | | 6/2002 | Wilson | |

FOREIGN PATENT DOCUMENTS

DE    3318628    * 11/1984
JP    3-77739    * 4/1991

* cited by examiner

*Primary Examiner*—James McClellan
*Assistant Examiner*—Mariano Sy
(74) *Attorney, Agent, or Firm*—Carlson, Gaskey & Olds

(57) ABSTRACT

A spring assembly includes a spring seat clamped to a leaf spring at a center portion. The spring seat includes a cutout for distributing clamping stresses in a substantially uniform manner across the leaf spring. The cutout provides a relief for a central portion of the leaf spring to uniformly distribute clamping pressures across the leaf spring. Uniformly distributing stresses across the width of the spring increases leaf spring fatigue life.

20 Claims, 3 Drawing Sheets

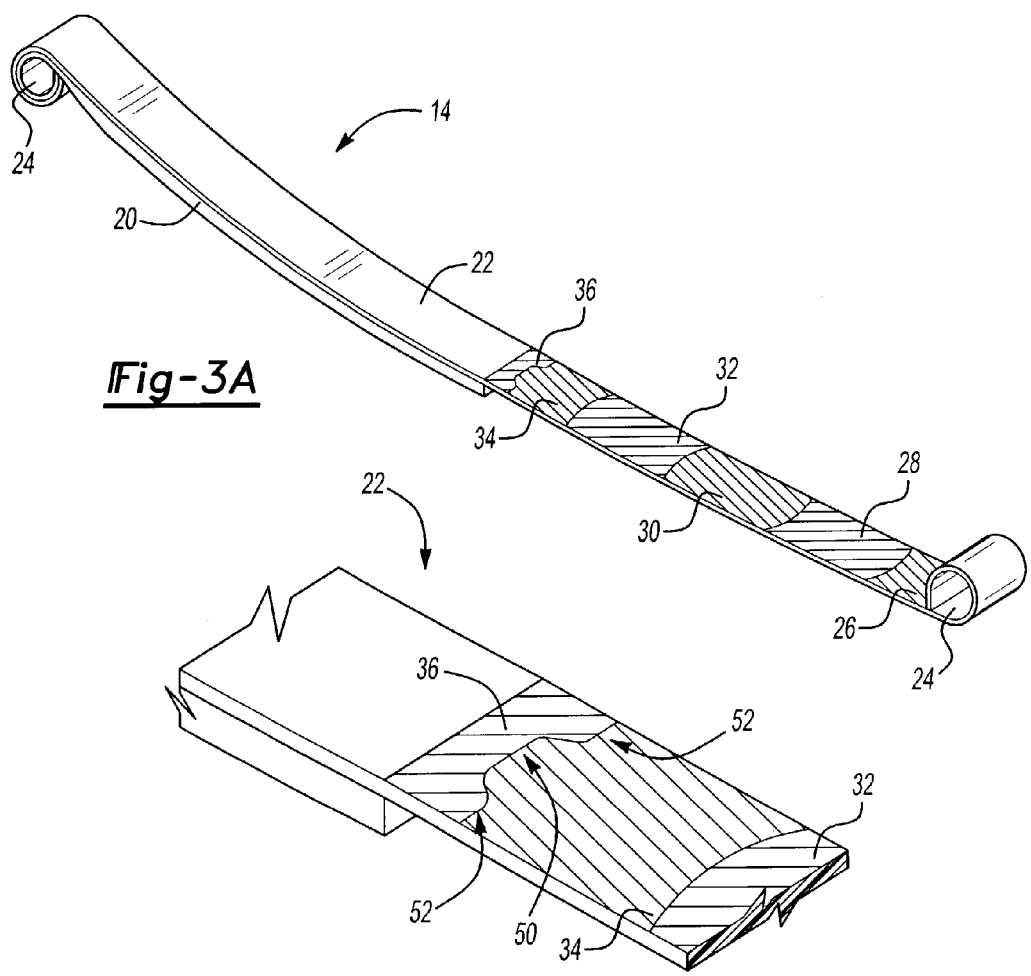
Fig-3A
Fig-3B
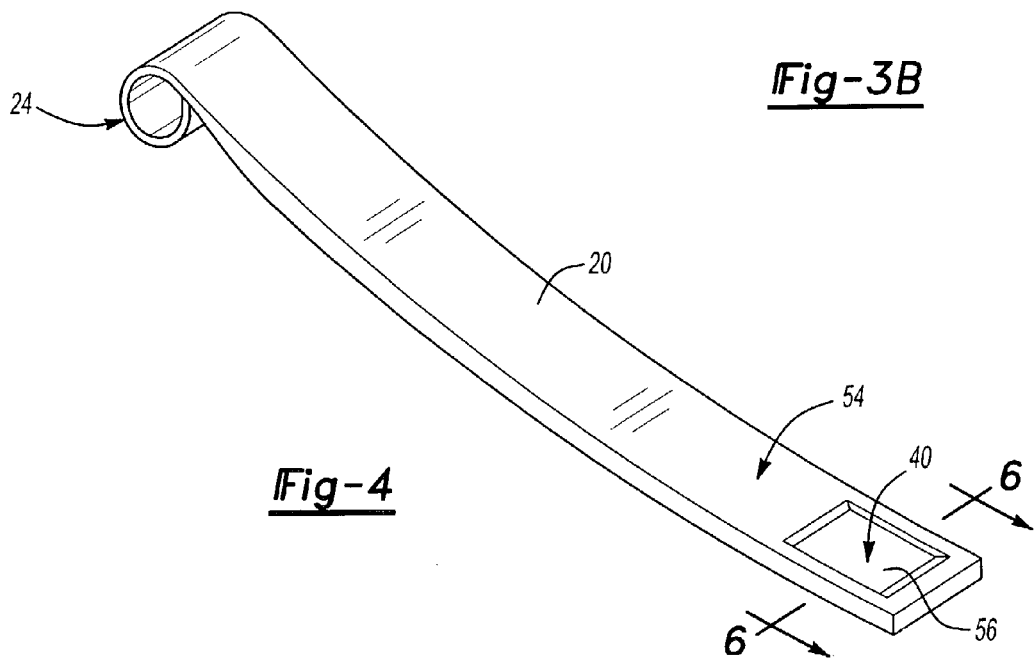
Fig-4

METHOD FOR RELIEVING SPRING SEAT MOUNTING STRESSES

BACKGROUND OF THE INVENTION

This invention generally relates to a leaf spring assembly and specifically to a method of relieving leaf spring mounting stresses.

Conventional leaf springs for vehicle suspensions comprise flat rolled steel strips having a substantially rectangular cross-sectional shape along a plane perpendicular to the longitudinal direction of each steel strip. The leaf spring assembly includes a clamped center portion for mounting of an axle and a suspension member. The suspension member is typically a coil or air spring to further absorb road inconsistencies. The highest stresses on the leaf spring are experienced in the clamped section of the leaf spring. Many stress relieving techniques and methods have been used in conventional leaf spring assemblies in order to reduce negative affects that high stress concentrations produce.

One conventional leaf spring assembly includes a short spring seat member and a single long leaf spring member. The long leaf spring member extends from a first mount to a second mount. The spring seat member extends to a central clamp securing the spring seat to the longer leaf spring. The axle or other suspension member is fastened at the center clamp. The highest stress within the long leaf spring occurs at the center clamp. The stress concentration at the center clamp is non-uniform across the leaf spring. The increased and non-uniform stress concentration typically results in reduced spring fatigue life.

Accordingly, it is desirable to develop a leaf spring assembly including stress-relieving features to uniformly distribute stresses and increase the overall fatigue life of the leaf spring assembly.

SUMMARY OF INVENTION

The present invention is a leaf spring assembly including stress-relieving features that uniformly distribute stresses within a clamped leaf spring member.

A leaf spring assembly designed according to the invention includes a shallow cutout disposed within a spring seat section. The cutout is positioned within the clamped section of the spring seat section that supports a leaf spring. The cutout supports the leaf spring at the edges in order to relieve constraints on the leaf spring middle section. Relief of the middle section of the leaf spring distributes stresses uniformly across the leaf spring. The uniform distribution of stresses within the leaf spring results in an increase in spring fatigue life. As appreciated, every 10% reduction in spring stress results in a doubling of spring fatigue life. The cutout within the spring seat provides a uniform distribution across the entire leaf spring. The uniform distribution results in a substantial increase in spring fatigue life.

Accordingly, a leaf spring assembly designed according to this invention provides a uniform stress distribution across the leaf spring to substantial increase in spring fatigue life.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3A is a view of a leaf spring designed according to this invention;
FIG. 3B is an enlarged view of the leaf spring of this invention at the maximum stress concentration area;
FIG. 4 is a perspective view of a spring seat including a stress relieving cut-out.

DETAILED DESCRIPTION OF THE PREFERRED EMBODIMENT

Figure 1:
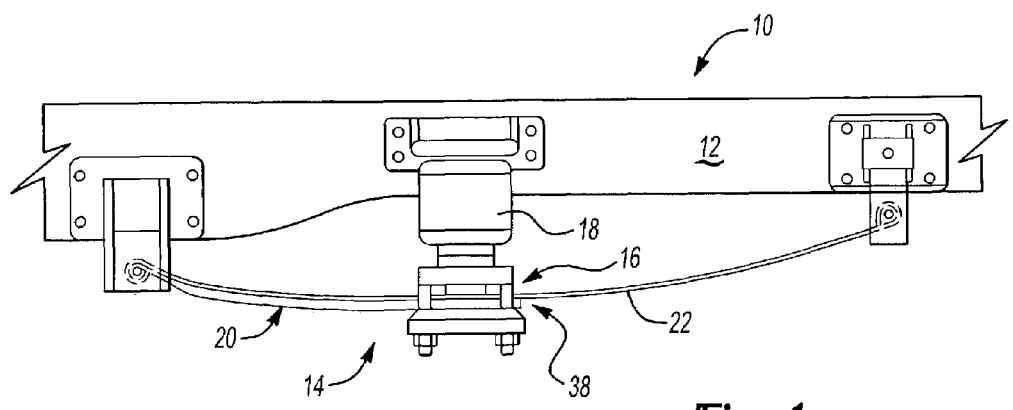
FIG. 1 is a schematic view of a leaf spring assembly.

Referring to FIG. 1, a suspension assembly 10 includes a spring scat 20 and a full leaf spring 22. The suspension assembly 10 is attached to a portion of the vehicle frame 12. The suspension assembly 10 includes a leaf spring assembly 14. A clamp 16 secures the spring seat 20 to the leaf spring 22 at a central section. The clamp 16 is also a mounting point for a suspension member 18. The spring seat 20 supports a portion of the leaf spring 22 from a mounting point to the clamp 16. in this illustrated example, the suspension member 18 is an air spring. The specific configuration of the spring suspension assembly at 10 is as known in the art and is only one illustration of a suspension assembly that can benefit from the descriptions of this invention.

The leaf spring 22 extends between support structures affixed to the frame 12. Spring seat 20 is clamped at a central section 38 to the leaf spring 22. It is at this portion in the center section 38 where the highest amount of plane stresses occur. The magnitude of plane stresses limits the spring fatigue life and therefore it is desirable to reduce and/or provide a uniform stress level within a section of the leaf spring 22.

Figure 2A:
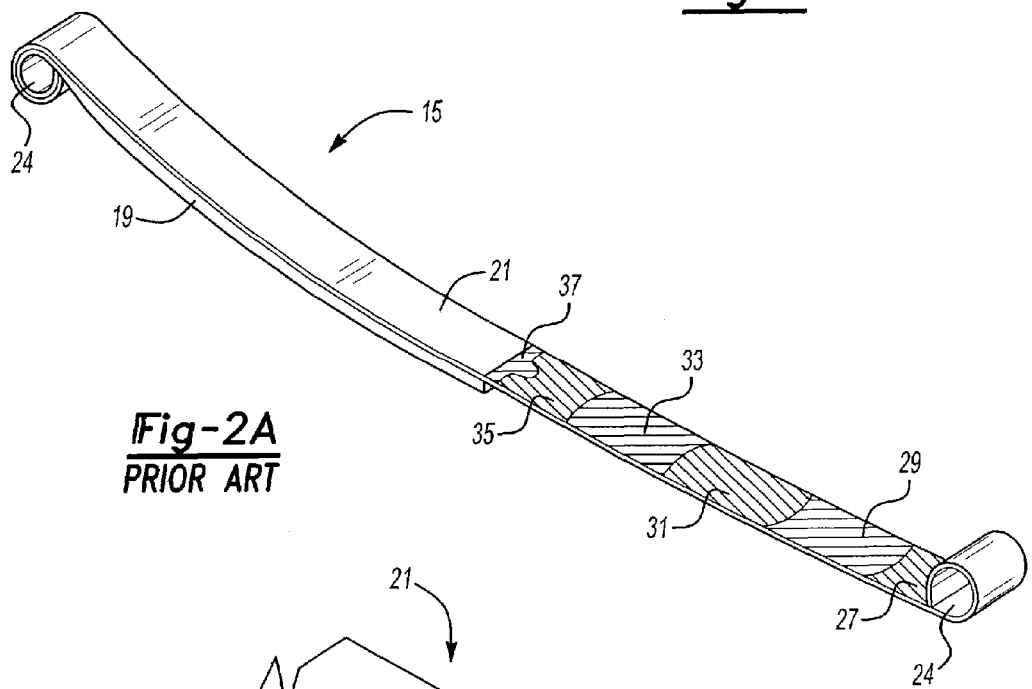
FIG. 2A is a prior art leaf spring.
Figure 2B:
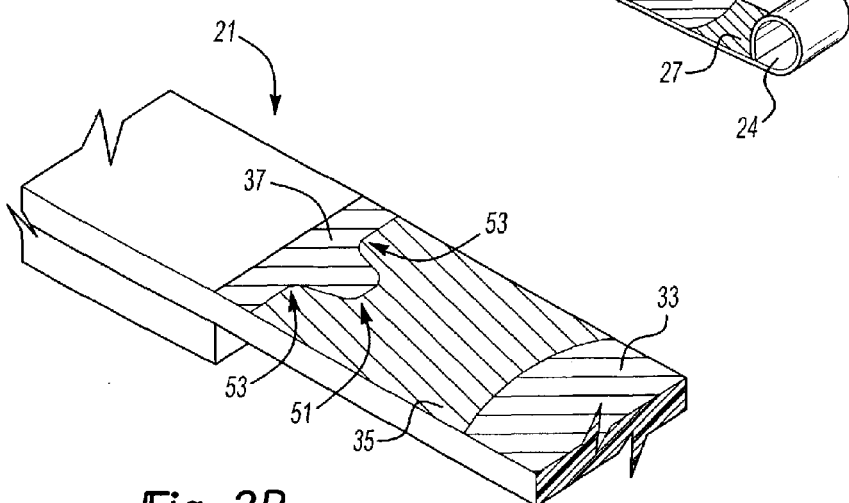
FIG. 2B is an enlarged view of the prior art leaf spring at the maximum stress concentration area.

Referring to prior art FIGS. 2A and 2B, a leaf spring 21 is supported by a spring seat 19. The leaf spring includes mounting features 24 on each end. Sections 27, 29, 31, 33, 35 and 37 indicate the magnitude of stress within the leaf spring 21. The stresses within each section steadily increase in magnitude from a lowest stress section 27 to a highest stressed section 37. The sections 27, 29, 31, 33, 35 and 37 experience bending stresses ranging from approximately −2800 psi, to 135,000 psi.

The highest stress is concentrated in the section indicated at 37. The section 37 is within the central section 38. The prior art spring seat 19 supports the leaf spring 21 and is clamped at the central section 38. It is at a center region 51 within section 37 that the greatest magnitude of stress is present and is therefore the limiting factor in spring fatigue life.

Referring to FIG. 2B, stresses within the section 37 are not uniformly distributed across the leaf spring 21. Calculations using traditional beam stress formulas predict a uniform stress distribution across the leaf spring 21. However, investigation into actual stresses within the leaf spring 21, found that the maximum stresses within the spring 21 are actually non-uniform. The center section of the leaf spring 21 at the clamp 16 measured approximately 25% higher than stresses at the edge of the leaf spring 21. The magnitudes of stresses are much higher in the center region 51 than on edge regions 53. This is indicated by the spike and stresses represented at the center region 51 within the section 37. The center region 51 is of a stress level approximately 25% higher than stress within the edge regions 53. The non-uniform stress across the leaf spring 21 adversely affects spring fatigue life. The large difference between stress levels in the center region 51 and edge regions 53 adversely affects spring fatigue life.

Referring to FIGS. 3A and 3B the spring seat 20 of this invention includes a cutout configuration that spreads bending stresses across the leaf spring 22 in a substantially uniform manner. The substantially uniform distribution within the inventive leaf spring 22 increases from a low stress section 26 to a highest stress section 36. Stresses within each section are approximately—2,800 psi in section 26, 35,000 psi in section 28, 42,000 psi in section 30, 75,000 psi in section 32, 90,000 psi in section 34 and 135,000 psi in section 36. The highest stress section is located in section 36 that is within the clamp 16 (FIG. 1) securing the leaf spring 22 to the spring seat 20.

The section 36 includes a center region 50 and edge regions 52. The stress levels indicated in the center region 50 are similar to stresses indicated at the edge regions. Therefore, the highest stress section 36 includes a substantially uniform stress level across the leaf spring 22. The uniform distribution of stress in the section 36 increases the spring fatigue life. This is because the uniformly distributed stress in the transverse direction relative to the leaf spring 22 decreases the maximum stress by approximately 10%. Each 10% decrease in maximum stress typically results in doubling the spring fatigue life. The spring seat 20 of this invention includes features that uniformly distribute the maximum stresses within section 36 across the entire width of the leaf spring 22.

Figure 5:
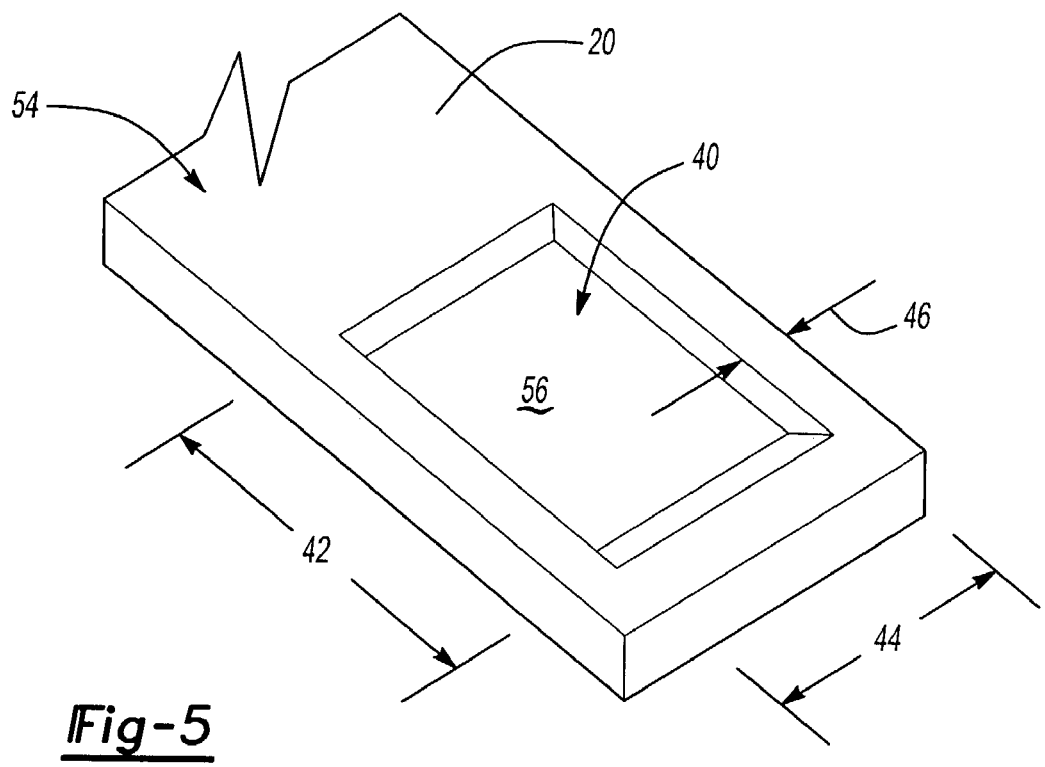
FIG. 5 is an enlarged view of the stress relieving cut out of the spring seat.
Figure 6:
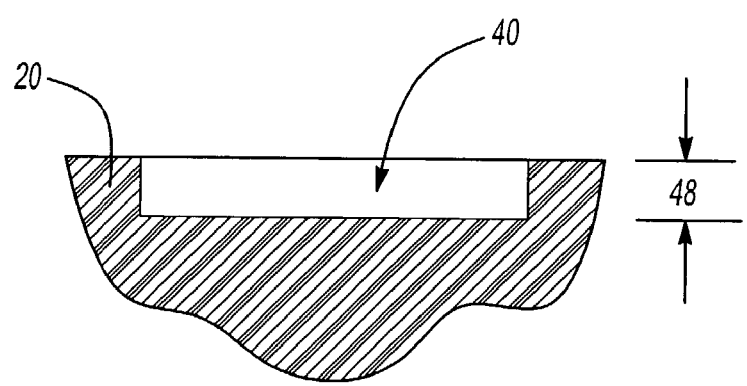
FIG. 6 is a cross-sectional view of the stress-relieving cutout.

Referring to FIGS. 4–6 the spring seat 20 supports the leaf spring 22 and is clamped together at the clamp 16 at the center section 38 (FIG. 1). The spring seat 20 includes a cutout 40 that supports edge regions 52 of the section 36 of the leaf spring 22. The cutout 40 relieves constraints on the center region 50 of the leaf spring 22 and causes a redistribution of stresses toward the edge regions 52. The redistribution of clamping forces toward the edge regions 52 of the leaf spring 22 decreases stresses within the center section 38 of the leaf spring 22 to provide a uniform distribution of stresses across the width of the leaf spring 22.

The cutout 40 is centered across the width of the spring seat 20 and includes a width 44. The width 44 corresponds with a width 46 at opposite edges of the spring seat 20. The width 46 is disposed on a surface 54 of the spring seat 20. The cutout 40 is disposed on a plane 56, differing from the surface 54. The center region 50 of the leaf spring 22 is preferably not directly supported by the surface 54. The width 46 supports the leaf spring 22, substantially relieving stress encountered within the center section of the leaf spring 22.

The cutout 40 also includes a length 42. The length 42 generally corresponds to the length of the clamp 16 (FIG. 1) such that the clamped area of the leaf spring 22 is supported over the cutout 40.

The cutout 40 further includes a depth 48. The depth 48 provides sufficient distance between the planes 56 and the surface 54 such that the leaf spring 22 remains unsupported in the center region 50.

The cutout 40 is shown as a rectangular depression, however it is within the contemplation of this invention that the cutout 40 may be of differing shapes and dimensions depending on application specific configurations and stress concentrations. Further, the dimensions of the cutout 40 may be modified, as a worker in the art would understand to accommodate application specific stress and leaf spring configurations.

The suspension assembly 10 of this invention includes the spring seat 20 that includes a cutout 40 for relieving constraints on the leaf spring 22 resulting in a uniform distribution of stress within the greatest stressed region within the leaf spring 22. The uniform distribution of stresses dramatically increases overall spring fatigue life.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A leaf spring assembly comprising:
   a spring seat having a first end and a second end wherein said first end is adapted to be supported by a vehicle frame;
   a leaf spring supported on said spring seat; and
   a clamp securing said leaf spring to said second end of said spring seat along a clamped portion, said spring seat including a cutout disposed along said clamped portion, wherein a center region of said leaf spring includes a bottom surface disposed over said cutout that is unsupported by said spring seat proximate said cutout.

2. The leaf spring assembly according to claim 1 wherein said leaf spring includes a first spring end adapted to be supported by a first vehicle structure, a second spring end adapted to be supported by a second vehicle structure, and a center portion positioned in an overlapping relationship to said cutout at said clamped portion.

3. The leaf spring assembly according to claim 2 wherein said spring seat includes a support surface extending between said first and said second ends with said cutout being formed within said support surface to define a recess between said bottom surface of said center portion of said leaf spring and an upper surface of said spring seat when said spring seat is clamped to said leaf spring.

4. The leaf spring assembly according to claim 2 wherein said leaf spring has a generally constant cross-sectional area extending between said first and said second spring ends.

5. A leaf spring assembly comprising:
   a leaf spring; and
   a spring seat having a first spring seat end adapted to be supported by a first vehicle structure, a second spring seat end adapted to be supported by a suspension clamp, and a support surface for supporting said leaf spring, said support surface extending between said first and said second spring sear ends, wherein said spring seat includes a depression formed within said support surface adjacent said second spring seat end, wherein said support surface defines a first plane and said depression defines a second plane that is vertically spaced apart from said first plane.

6. The leaf spring assembly according to claim 5 wherein said leaf spring has a first end adapted to be supported by the first vehicle structure, a second end adapted to be supported by a second vehicle structure, and a center portion adapted to be supported by the suspension clamp wherein said center portion is positioned in an overlapping relationship to said depression.

7. The leaf spring assembly according to claim 6 wherein the suspension clamp clamps said second spring seat end to said center portion.

8. The leaf spring assembly according to claim 7 wherein said spring seat supports said leaf spring along said support surface between said first end and said center portion.

9. The leaf spring according to claim 5 wherein said leaf spring has a first end adapted to be supported by the first vehicle structure and a second end adapted to be supported by a second vehicle structure and wherein said leaf spring has a generally constant cross-sectional area extending between said first and said second ends.

10. A leaf spring assembly comprising:
a leaf spring; and
a spring seat having a first spring seat end adapted to be supported by a first vehicle structure, a second spring seat end adapted to be supported by a suspension clamp, and a support surface for supporting said leaf spring, said support surface extending between said first and said second spring seat ends, wherein said spring seat includes a depression formed within said support surface adjacent said second spring seat end, wherein said spring seat is defined by a spring seat width, defined perpendicular to a longitudinal direction extending between said first and said second spring seat ends, and a spring seat length, defined parallel to said longitudinal direction, said spring seat width being less than said spring seat length and wherein said depression has a maximum depression width that is less than said spring seat width.

11. The leaf spring assembly according to claim 10 wherein said support surface includes a first support edge positioned on one side of said depression and a second support edge positioned on an opposite side of said depression and wherein a center portion of said leaf spring is supported on said first and said second support edges.

12. The leaf spring assembly according to claim 11 wherein said center portion of said leaf spring includes an upper surface adapted to support a suspension component and a lower surface that is positioned directly over said depression.

13. A leaf spring assembly comprising:
a leaf spring; and
a spring seat having a first spring seat end adapted to be supported by a first vehicle structure, a second spring seat end adapted to be supported by a suspension clamp, and a support surface for supporting said leaf spring, said support surface extending between said first and said second spring seat ends, wherein said spring seat includes a depression formed within said support surface adjacent said second spring seat end, wherein said depression comprises a rectangular shaped recess having a bottom surface and a plurality of side walls that extend upwardly from said bottom surface to said support surface.

14. A leaf spring assembly comprising:
a clamp;
a leaf spring having a first end adapted to be supported by a first vehicle structure, a second end adapted to be supported by a second vehicle structure, and a center portion supported by said clamp; and
a spring seat having a first spring seat end adapted to be supported by the first vehicle structure and a second spring seat end clamped to said center portion of said leaf spring with said clamp wherein said spring seat is defined by a first cross-sectional area at said first spring seat end and by a second cross-sectional area at said second spring seat end that, wherein said spring seat includes a support surface extending between said first and second ends and said second spring seat end includes a bottom surface spaced apart from said support surface.

15. The leaf spring assembly according to claim 14 wherein said leaf spring is supported by said support surface between said first end and said center portion.

16. The leaf spring assembly according to claim 15 wherein said spring seat includes a removed portion including said bottom surface formed within said support surface adjacent to said second spring seat end, said center portion of said leaf spring being positioned in an overlapping relationship to said removed portion.

17. The leaf spring assembly according to claim 16 wherein said removed portion forms a recess between a lower surface of said center portion of said leaf spring and an upper surface of said second spring seat end when said leaf spring is clamped to said spring seat with said clamp.

18. The leaf spring assembly according to claim 17 wherein said leaf spring has a generally constant cross-sectional area extending between said first and said second ends.

19. The leaf spring assembly according to claim 17 wherein said recess comprises a rectangular shaped cutout having said bottom surface spaced apart from said support surface.

20. The leaf spring assembly according to claim 17 wherein said support surface has a first support edge positioned on one side of said recess and a second support edge positioned on an opposite side of said recess and wherein said center portion of said leaf spring is directly supported by said first and said second support edges.

* * * * *

UNITED STATES PATENT AND TRADEMARK OFFICE
CERTIFICATE OF CORRECTION

| | | |
|---|---|---|
| PATENT NO. | : 7,210,673 B2 | Page 1 of 1 |
| APPLICATION NO. | : 10/411488 | |
| DATED | : May 1, 2007 | |
| INVENTOR(S) | : Platner et al. | |

It is certified that error appears in the above-identified patent and that said Letters Patent is hereby corrected as shown below:

Claim 5, Column 4, line 60: "sear" should be --seat--

Signed and Sealed this

Twenty-sixth Day of June, 2007

JON W. DUDAS
*Director of the United States Patent and Trademark Office*